Dec. 30, 1958  G. H. DIMOND  2,866,577
RECTIFIER FOR ORIENTING BOTTLE CAPS
Filed May 3, 1957  3 Sheets-Sheet 1
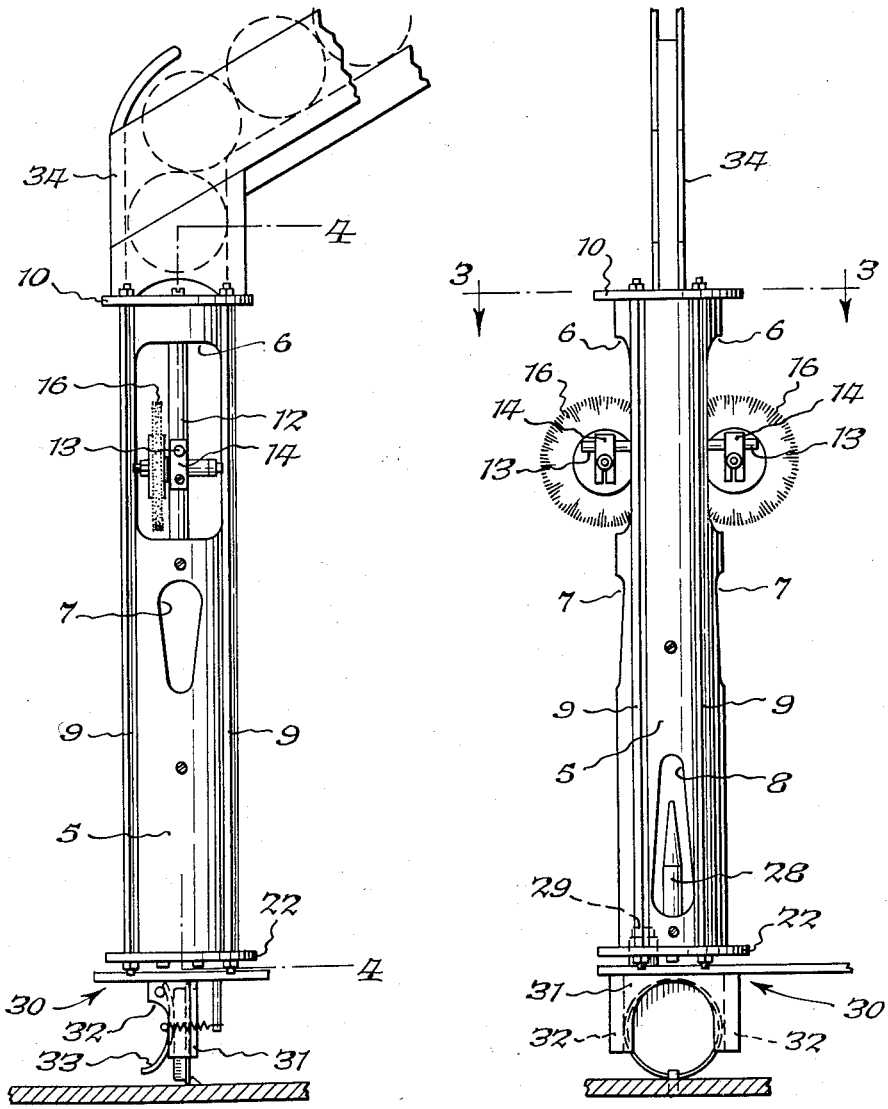
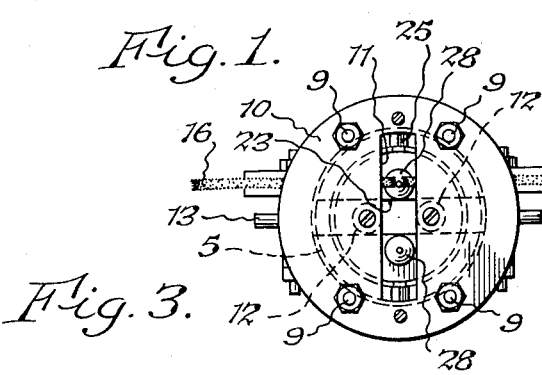
Fig. 1.  Fig. 2.  Fig. 3.
INVENTOR.
George H. Dimond
BY
Thomas E. Tate
Agent.

Dec. 30, 1958        G. H. DIMOND        2,866,577
RECTIFIER FOR ORIENTING BOTTLE CAPS
Filed May 3, 1957                      3 Sheets-Sheet 2
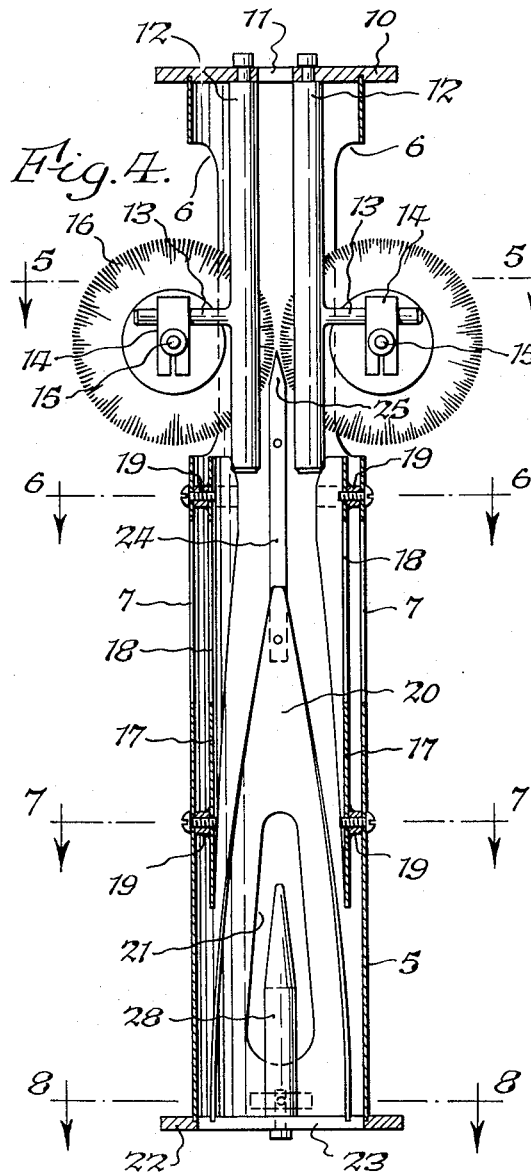
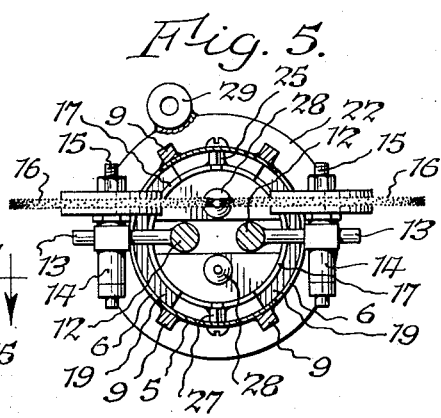
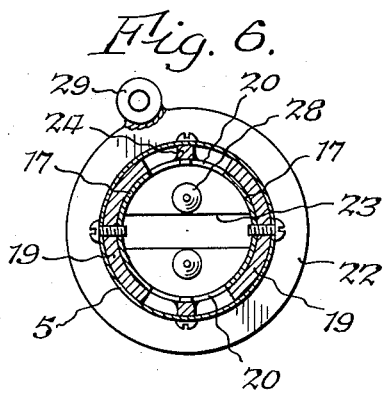
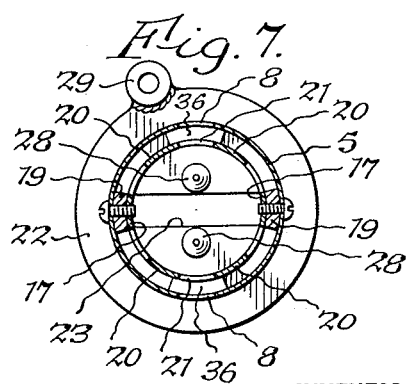
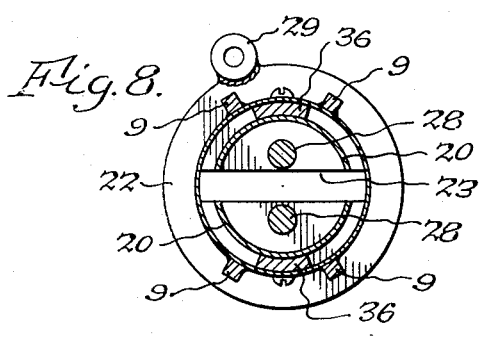
INVENTOR.
George H. Dimond
BY Thomas E. Tate
Agent.

Dec. 30, 1958  G. H. DIMOND  2,866,577
RECTIFIER FOR ORIENTING BOTTLE CAPS
Filed May 3, 1957  3 Sheets-Sheet 3
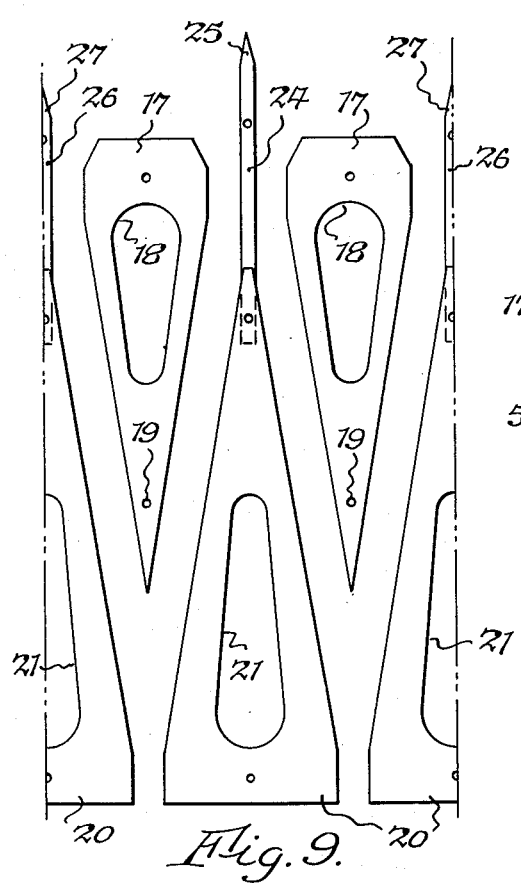
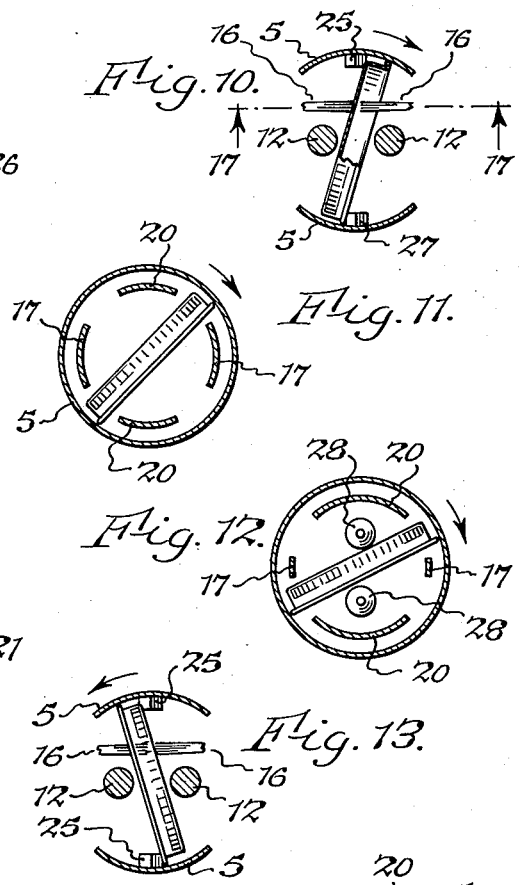
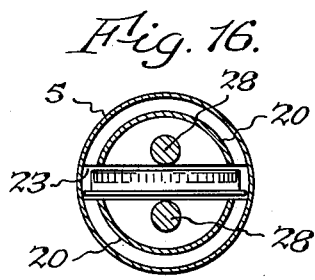
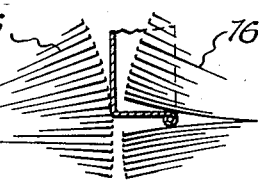
INVENTOR.
George H. Dimond
BY
Thomas E. Tate
Agent.

United States Patent Office 2,866,577
Patented Dec. 30, 1958

2,866,577

RECTIFIER FOR ORIENTING BOTTLE CAPS

George H. Dimond, East Aurora, N. Y., assignor to Consolidated Packing Machinery Corporation, Buffalo, N. Y., a corporation of New York Application May 3, 1957, Serial No. 656,945

3 Claims. (Cl. 221—173)

This invention relates generally to new and useful improvements in cap sorters and particularly seeks to provide a novel rectifier capable of presenting wide, shallow bottle caps to a capping machine in properly oriented positions such that all caps are faced in the same direction.

Many forms of cap sorting machines are known by which the rapid orientation of relatively narrow diameter, deep-skirted bottle caps may be achieved. Most such sorting or orienting devices rely for the effectiveness of their operation upon the fact that the deep-skirted caps will readily overbalance about a transverse axis. However, in the case of wide, shallow caps their very shallowness prevents any overbalancing type of sorting or orienting.

Through the use of a cap rectifier or sorter constructed in accordance with this invention it is possible to effect the high speed orientation of wide, shallow caps in which the diameter-to-depth ratio is, say, 4 to 1 or greater.

It is therefore an object of this invention to provide a novel cap rectifier capable of effecting high speed orientation of wide, shallow bottle caps.

A further object of this invention is to provide a cap rectifier of the character stated which includes two coaxially arranged helical passages of opposite twist through either one or the other of which all caps to be oriented must pass.

A further object of this invention is to provide a cap rectifier of the character stated in which successive caps are presented to the tops of the twin helical passages for orientation, but prior to the actual entry thereof into one or the other of such passages are contacted by controlling devices which determine which of the helical passages is to receive each cap.

A further object of this invention is to provide a cap rectifier of the character stated in which it is necessary to twist the caps only through an arc of 90° either clockwise or counterclockwise as they pass through one of the helical passages in order to effect proper orientation thereof.

A further object of this invention is to provide a cap rectifier of the character stated in which the twist direction control devices consist of a pair of freely rotatable disc brushes arranged with their peripheries in near tangential relationship and between which each successively presented cap passes.

A further object of this invention is to provide a cap rectifier of the character stated which is simple in design, rugged in construction and economical to manufacture.

With these and other objects in view, the nature of which will be more apparent, the invention will be more fully understood by reference to the drawings, the accompanying detailed description and the appended claims.

In the drawings,

Fig. 1 is a front elevation of a cap rectifier constructed in accordance with this invention;

Fig. 2 is a side elevation thereof;

Fig. 3 is a horizontal section taken along line 3—3 of Fig. 2;

Fig. 4 is a transverse vertical section taken along line 4—4 of Fig. 1;

Fig. 5 is a horizontal section taken along line 5—5 of Fig. 4;

Fig. 6 is a horizontal section taken along line 6—6 of Fig. 4;

Fig. 7 is a horizontal section taken along line 7—7 of Fig. 4;

Fig. 8 is a horizontal section taken along line 8—8 of Fig. 4;

Fig. 9 is a development of the elements defining the two coaxially opposite twist helical passages;

Figs. 10 to 12, inclusive, are sequential fragmentary horizontal sections showing the progress of a cap as it approaches and enters the helical passage for a clockwise twist;

Figs. 13 through 15, inclusive, are views similar to Figs. 10 to 12, but show the progress of a cap along the helical passage for a counterclockwise twist;

Fig. 16 is a fragmentary horizontal section taken adjacent the bottom of the cap rectifier and shows the position at which all caps are finally deposited after having traversed either of the helical passages; and Fig. 17 is an enlarged fragmentary vertical section taken along line 17—17 of Fig. 10.

Referring to the drawings in detail the invention as illustrated is embodied in a cap-rectifying or orienting device which includes a vertically disposed cylindrical outer shell or sleeve 5 provided adjacent its upper end with a pair of diametrically opposed generally rectangular apertures 6, 6 through which are received portions of bottle cap controlling devices, as will be hereinafter more fully described.

The sleeve 5 is provided intermediate its ends with a pair of elongated diametrically opposed access and inspection openings 7, 7 and is provided adjacent its lower ends with a similar pair of openings 8, 8. The outer surface of the sleeve 5 is provided with four stiffening bars 9 rigidly secured thereto and disposed with their upper and lower ends extending beyond the corresponding ends of the sleeve, with the thus projecting ends being threaded to receive end plate clamping nuts.

The top of the sleeve 5 is closed by a top cover plate 10 secured on the upwardly projecting ends of the bars 9, and this plate is provided with a centrally positioned rectangular slot 11, the length and width of which correspond to the diameter and depth of the size caps whose facing direction is to be oriented.

A pair of pivot guides 12, 12 are dependently secured to the under side of the plate 10 and are spaced apart a distance equal to the width of the rectangular slot 11 and extend down into the sleeve 5 to a plane slightly below that of the lower edges of the openings 6. Each of the guides 12 is provided with a radially extending arm 13 carrying a clamp 14 which secures a horizontally extending stub shaft 15 upon the projecting end of which is mounted for free rotation a disc type brush 16 having radially extending bristles. It will be observed that the brushes 16 are of such a diameter that their adjacent edges are disposed in near tangential relationship.

The inside of the sleeve 5 in the zone lying below the plane of the bottom of the openings 6 is provided with elements that define a pair of helical passages coaxially arranged but of opposite twist and with a total twist of 90°. In order to define these helical passages the inside of the sleeve 5 is provided with a pair of generally triangularly shaped, arcuately cross-sectioned plates 17, 17 each provided with an aperture 18 corresponding to the apertures 7, 7 in the sleeve. The plates 17 are secured within the sleeve 5 with their apices pointing downwardly by spacer elements and screws generally indicated at 19.

A complementary pair of symmetrically opposed, generally triangular, arcuately cross-sectioned plates 20, 20 are secured within the lower portion of the sleeve 5 and are each provided with an aperture 21 corresponding in size and shape with the apertures 8 in the sleeve. These plates 20 are secured with their apices pointing upwardly and have their lower ends received within grooves formed in a bottom cover plate 22 which is secured to the depending lower threaded ends of the bars 9 and is provided with a rectangular slot 23 which corresponds dimensionally with the slot 11 in the top plate 10 but is disposed at an angle of 90° with respect thereto.

A relatively long starting guide 24 extends upwardly from one of the plates 20 and is provided with a pointed upper end 25 located in approximately the horizontal plane passing through the axes of the stub shafts 15. A similar but somewhat shorter starting guide 26 having a pointed upper end 27 projects upwardly from the other of the plates 20 on the opposite side of the sleeve 5.

The bottom cover plate 22 is provided with a pair of spaced parallel vertically disposed stacking guides 28, 28 secured thereto and disposed on either side of the slot 23 such that the spacing therebetween is substantially equal to the width of the slot. The upper ends of the stacking guides 28 are located in a horizontal plane slightly above that of the lower apices of the arcuate plates 17.

The bottom cover plate 22 is provided with an outwardly extending lug 29 to which is dependently attached the usual type of escapement or detent device generally indicated at 30 and which includes an open face plate 31, a pair of solid side plates 32, 32 and a spring-biased gate or detent 33 which collectively define a channel for receiving each cap as it drops through the slot 23 in the bottom plate after having become oriented in the proper direction.

In use a cap rectifier constructed in accordance with this invention is mounted by any suitable means (not shown) in such a position on a capping machine that the escapement device 30 is positioned in alignment with those devices of the capping machine that become effective to remove individual caps from the escapement. The upper end of a cap rectifier is positioned adjacent the lower or discharge end of a feed chute 34 which successively receives unoriented bottle caps from any suitable form of feeding device (not shown).

As a cap leaves the feed chute 34 and enters the slot 11 at the top of the rectifying unit it passes downwardly between the depending pivot guides 12, 12 under the influence of gravity. As the cap drops down between the guides 12 its closed face will be contacted by one or the other of the brushes 16 which becomes effective to impart a slight twisting motion to the cap in either a clockwise or counterclockwise direction. If the cap drops through the slot 11 with its closed face to the left hand as viewed in Fig. 4 the left hand brush 16 will contact the closed face of the cap and tend to push it in a clockwise direction as more clearly illustrated in Fig. 10 of the drawings. As this action takes place the lip or skirt of the cap is received between the bristles of the other brush 16, as clearly illustrated in Figs. 10 and 17 of the drawings.

Since the brushes 16 are freely rotatable on their shafts the weight of the cap dropping between the guides 12 under the influence of gravity is sufficient to cause the brushes to function in the manner described above. Continued downward movement of the cap causes the rear edge portion to pass over the pointed upper end 25 of the guide 24 which imparts an additional clockwise twisting motion to the cap to insure that the forward edge will not catch on point 27 of guide 26. As the cap continues to drop downwardly its forward edge portion engages the left hand side of the pointed upper end 27 of the guide 26 and thereupon the two guides 24 and 26 become effective to direct and control the entrance of the cap into the right hand twist passage of the two helical passages defined by the plates 17 and 20. Figs. 10, 11 and 12 of the drawings illustrate the progressive clockwise twisting of the cap during its downward passage through the rectifying unit. Its final position is shown in Fig. 16 of the drawings.

If on the other hand a cap drops through the slot 11 with its closed face to the right as viewed in Fig. 4 of the drawings, the right hand brush 16 becomes effective to impart a slight counterclockwise twisting movement to the cap and thereafter the guides 24 and 26 become effective to control and direct the entrance of the cap into the helical passage having the left hand or counterclockwise twist. The progress of the cap under these conditions is clearly indicated in Figs. 13 through 16 of the drawings.

It will be readily appreciated from the sequences shown in Figs. 10 to 12 and 13 to 15 that regardless of whether a cap passes down through the clockwise or counterclockwise helical passage, depending upon the way it faced when introduced to the rectifier, its ultimate orientation will always assume the position shown in Fig. 16.

It will be appreciated that although the illustrated embodiment of the rectifier shows the sleeve 5 and its associated elements oriented about a vertical axis, the rectifier will work equally well if oriented about an axis substantially off the vertical.

In the event that extremely light caps are to be oriented with a cap rectifier of this type and it is found that there is not sufficient headroom thereover to develop an adequate gravity head in the supply chute 34 it is entirely feasible to operate the sensing and control brushes 16 by power driven means, in which case they would, of course, serve the added function of a feeder.

It is, of course, to be understood that various details of arrangements and proportions of parts may be modified within the scope of the appended claims.

I claim:

1. A bottle cap rectifier including a shell having upper and lower ends provided internally with a pair of helical passages of opposite twist on a common axis for orienting successively presented caps so that they all face in the same direction upon discharge therefrom, means to introduce caps to the upper end of said shell in successive edgewise relation, and control means located above said helical passages and including a pair of rotatable disc brushes having radially extending bristles and disposed in near-tangential relationship, one of said brushes being effective to contact the closed face of each successively presented cap to impart a slight pivotal movement thereto around said common axis and thus to determine through which one of the said helical passages each cap will pass.

2. A bottle cap rectifier including a shell having upper and lower ends provided internally with a pair of helical passages of opposite twist on a common axis and extending through 90° of rotation for orienting successively presented caps so that they all face in the same direction upon reaching the lower ends thereof, a pair of guides above said passages symmetrically spaced from and parallel to said axis, means to introduce caps between said guides in successive edgewise relation, and control means located adjacent said guides and including a pair of rotatable disc brushes having radially extending bristles and disposed in near-tangential relationship, one of said brushes being effective to contact the closed face of each successively presented cap as it slides down between said guides to impart a slight twisting pivotal movement thereto around said common axis and thus to determine through which one of the said helical passages said cap will pass, the lip of said cap being received between the bristles of the other of said brushes.

3. A bottle cap rectifier having opposite ends defining a longitudinal axis and comprising means at one said end to receive successive bottle caps edgewise on said axis in random face directions, a pair of bottle cap passages extending from said receiving means generally along said axis to an outlet at said other end, at least one of said passages being arranged to impart a twist to bottle caps passing through it thereby orienting them with bottle caps passing through the other said passage, and a pair of rotatable disc brushes having radially extending bristles disposed in near-tangential relationship at a position displaced from said axis, one of said brushes being effective operatively to contact the closed face of each successive cap and to impart an initial pivotal movement around said common axis thereby directing said bottle cap to one of said passages.

References Cited in the file of this patent

UNITED STATES PATENTS

| | | |
|---|---|---|
| 898,113 | Jones | Sept. 8, 1908 |
| 2,771,978 | Neuhaus et al. | Nov. 27, 1956 |